United States Patent
Ondrus et al.

(10) Patent No.: US 7,094,299 B2
(45) Date of Patent: Aug. 22, 2006

(54) METHOD FOR ROBOTICALLY APPLYING LARGE VOLUMES OF STRUCTURAL FOAM WITHIN AUTOMOTIVE APPLICATIONS

(75) Inventors: Daniel J. Ondrus, Northville, MI (US); Jeffrey Petty, Livonia, MI (US); Kenneth P. Tremonti, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 385 days.

(21) Appl. No.: 10/428,567

(22) Filed: May 2, 2003

(65) Prior Publication Data

US 2004/0217498 A1    Nov. 4, 2004

(51) Int. Cl.
  *B32B 5/20* (2006.01)
  *B32B 31/12* (2006.01)
(52) U.S. Cl. .................. 156/79; 156/78; 264/45.5; 264/45.9; 264/46.7
(58) Field of Classification Search .................. None
  See application file for complete search history.

(56) References Cited

U.S. PATENT DOCUMENTS

| | | | |
|---|---|---|---|
| 4,043,721 A | 8/1977 | Lemelson | |
| 4,285,903 A | 8/1981 | Lemelson | |
| 5,173,227 A | 12/1992 | Ewen et al. | |
| 5,556,471 A | 9/1996 | Boccagno et al. | |
| 5,744,077 A | 4/1998 | Grisch et al. | |
| 5,833,796 A | 11/1998 | Matich | |
| 6,146,565 A * | 11/2000 | Keller | 264/46.5 |
| 6,207,244 B1 | 3/2001 | Hesch | |
| 6,299,246 B1 | 10/2001 | Tomka | |
| 6,309,012 B1 | 10/2001 | Fryk et al. | |
| 6,311,452 B1 | 11/2001 | Barz et al. | |
| 6,331,028 B1 | 12/2001 | O'Neill et al. | |
| 6,337,355 B1 * | 1/2002 | Yamashita et al. | 521/115 |
| 6,413,611 B1 | 7/2002 | Roberts et al. | |
| 6,419,305 B1 | 7/2002 | Larsen | |
| 2003/0062739 A1 * | 4/2003 | Bock | 296/39.3 |

FOREIGN PATENT DOCUMENTS

| | | |
|---|---|---|
| EP | 1 074 457 A2 | 2/2001 |
| JP | 3 269080 | 11/1991 |
| WO | WO 01/58741 A1 | 8/2001 |
| WO | WO 02/26551 A1 | 4/2002 |

* cited by examiner

*Primary Examiner*—Sam Chuan Yao
(74) *Attorney, Agent, or Firm*—Raymond L. Coppiellie; Steven W. Hays

(57) ABSTRACT

An innovative robotic foam application process that integrates system communications, non-contact vehicle insertion point locations, and applications controls to accurately dispense a two-component structural foam at a high volume and flow rate. The process begins by first inserting a baffle within the support structure. After an electrocoat application and bake, the baffles expand and are sealed within the support structure to form cavities having a fill hole. A hydraulic driven robotic dispensing system equipped with a high-pressure static mixer senses the respective fill hole, moves a robotic arm to a location sensed, and injects a high volume of mixed two-component viscous material within each of the respective located fill holes at a high fill rate. After dispensing, the viscous material undergoes an exothermic curing reaction to cure and is expanded to substantially fill each cavity.

7 Claims, 4 Drawing Sheets

METHOD FOR ROBOTICALLY APPLYING LARGE VOLUMES OF STRUCTURAL FOAM WITHIN AUTOMOTIVE APPLICATIONS

TECHNICAL FIELD

The present invention relates generally to robotic devices and more particularly to a method of robotically applying large volumes of structural foam within automotive applications.

BACKGROUND

In recent years, the automobile industry has attempted to improve the soundproof property of the riding space while maintaining handling, drivability and durability of the vehicle. In order to achieve these requirements, demands have been made to provide to provide the rigidity and the soundproof property to a variety of areas where loads are imposed.

It has been suggested that one method for increasing the rigidity of the vehicle body is to introduce a two-component (also known as a two-pack or 2K) foam into a closed section of the vehicle's pillars.

Various problems, however, are inherent in currently available technologies or may result by injecting the two-component foam composition into the closed sectional structure. For example, while low volume dispensing of two-component mixtures is well known, there is no known process capable of injecting the foam at a sufficient rate and volume into a vehicle structure with numerous openings that ensures that the cavities are completely filled.

Further, while manual dispensing of higher volume mixtures is also well known, there is no known automated processes that successfully and accurately dispenses high volumes of foam at a high flow rate.

SUMMARY OF THE INVENTION

The present invention addresses some of the problems listed above by providing an innovative robotic foam application process that integrates system communications, non-contact vehicle insertion point locations, and applications controls to accurately dispense a two-component epoxy foam at a high volume and flow rate.

The process begins by first inserting a baffle structure into inner and/or outer structure openings during pillar fabrication. Each baffle is error proofed to assure presence and proper fabrication. After body assembly, the vehicle is processed through an electrocoat system. During electrocoat bake, the baffles expand and seal cavity openings. Miscellaneous plugs, grommets, and tape are installed over the remaining cavity holes on the sealer deck. After complete processing, the vehicle enters into a structural foam injection cell. Upon entry into the cell, a three-dimensional vision system is used to locate each fill position. A hydraulic driven robotic dispensing system equipped with a high-pressure static mixer injects a high volume of mixed two-component viscous fluid material within each of the respective located fill positions using an anti-drool nozzle. After and during dispensing, the material undergoes an exothermic reaction ("curing reaction"). At the same time, the material is also expanded ("foamed") to substantially fill its respective cavity.

Other objects and advantages of the present invention will become apparent upon considering the following detailed description and appended claims, and upon reference to the accompanying drawings.

DETAILED DESCRIPTION OF THE PREFERRED EMBODIMENT(S)

The present invention relates to a method for introducing a structural two-component foam material within the structural components of a vehicle using an innovative robotic high volume structural foam process. To help illustrate this process, one proposed use of the present invention is illustrated utilizing the D-Pillar for a sports utility vehicle. As such, the process described below should not be construed to be limited to the D-pillar or limited to a sports utility vehicle, but may find wide reaching applications for reinforcing structures within the automotive or other industries.

Figure 1:
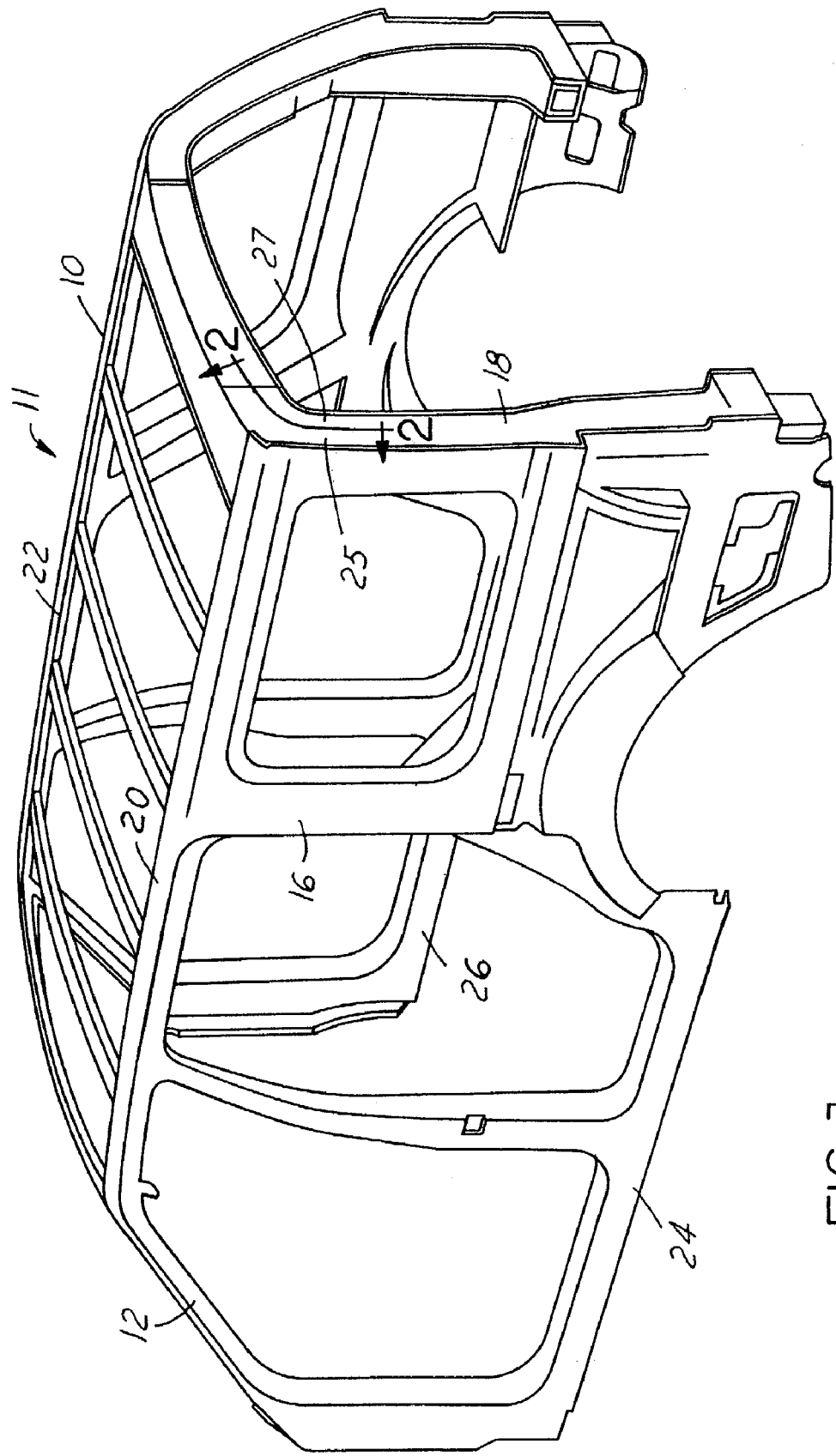
FIG. 1 is a perspective view of a vehicle support structure.

Referring now to FIG. 1, a perspective view of a vehicle support structure 10 for a sport utility type vehicle 11 is illustrated as having a pair of A pillars 12, B pillars 14, C pillars 16 and D pillars 18 interconnected through a pair of roof side rails 20, 22 and a pair of bottom rails 24, 26.

As best shown in FIGS. 2–6, the D-pillars 18 includes an outer portion 25 and an inner portion 27 coupled together such that a hollow region 29 is formed therein. The D-pillars have a pair of containment baffles 40 sealed to the inner walls 41 of the outer portion 25 and inner portion 27 and that together define a respective upper 28 and lower cavity 30 within the hollow region 29. As seen in FIGS. 1–6, the outer and inner portion 25, 27 and baffles 40 contain a layer of electrocoat (shown as 43 in FIG. 2). The electrocoat 43 functions as a barrier protector and also aids in adhering the baffles 40 to the inner walls 41.

Figure 2:
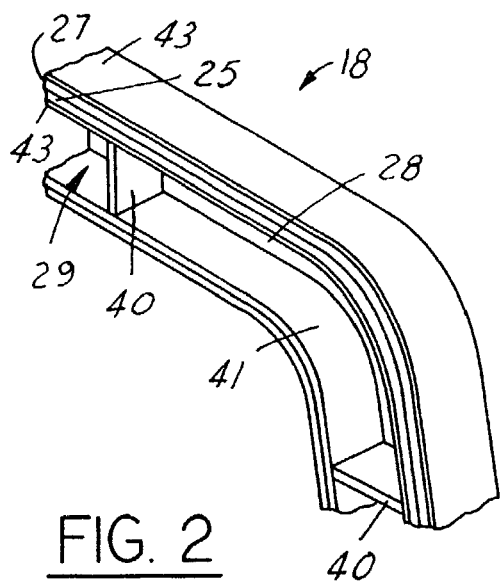
FIG. 2 is a section view of a portion of the D-Pillar of FIG. 1.
Figure 3:
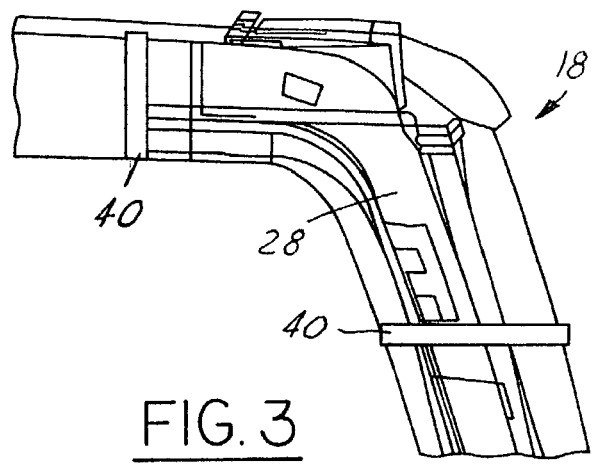
FIG. 3 is a close-up section view of a portion of FIG. 1.
Figure 4:
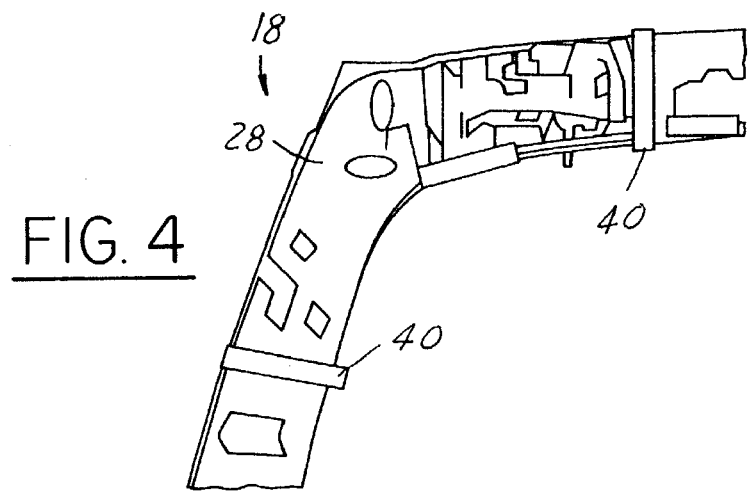
FIG. 4 is a close-up section view of another portion of FIG. 1.
Figure 5:
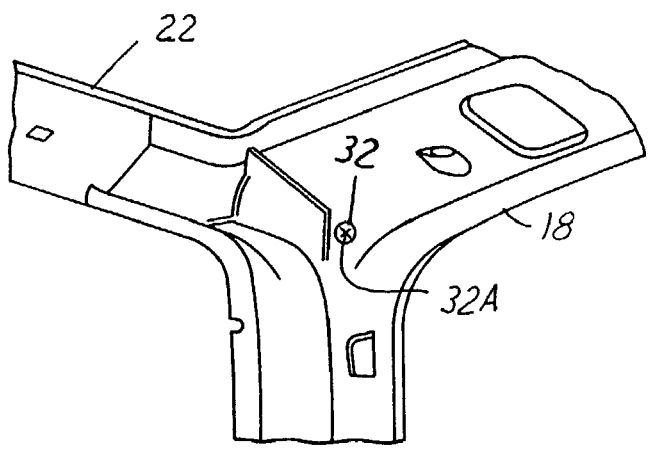
FIG. 5 is a perspective view of a portion of FIG. 1.
Figure 6:
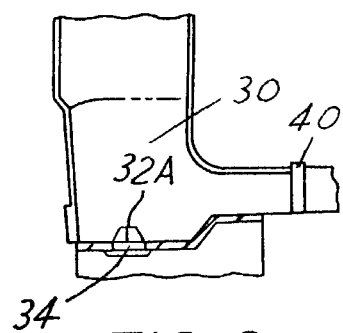
FIG. 6 is a section view of a portion of FIG. 1.

Each of these cavities 28, 30 is subsequently substantially filled with foam 78 through a respective fill hole 32, 34 using a robotic high volume foam application device (shown as 70 in FIG. 76). The fill holes 32, 34, each have a septum 32A, 32B that seals around the inserted foam device 70 to prevent the foam 78 from exiting from the respective cavity 28, 30 during the filling step. The foam 78 is a two-component viscous mixture that exothermically reacts and expands after mixture of the two viscous components and introduction into the cavities 28, 30. A vehicle 9 having the foam filled D-pillars 18 as shown in FIGS. 1 and 2 achieves a vehicle torsional stiffness of greater than 20 Hertz, resulting in a 42% increase in static torsional stiffness (a 2 dBA overall on rough road) as compared with similar vehicles not having the foam filling. Vehicles 9 having the foam filled D-pillars 18 also exhibit less squeak and rattle and speech intelligibility.

Figure 7:
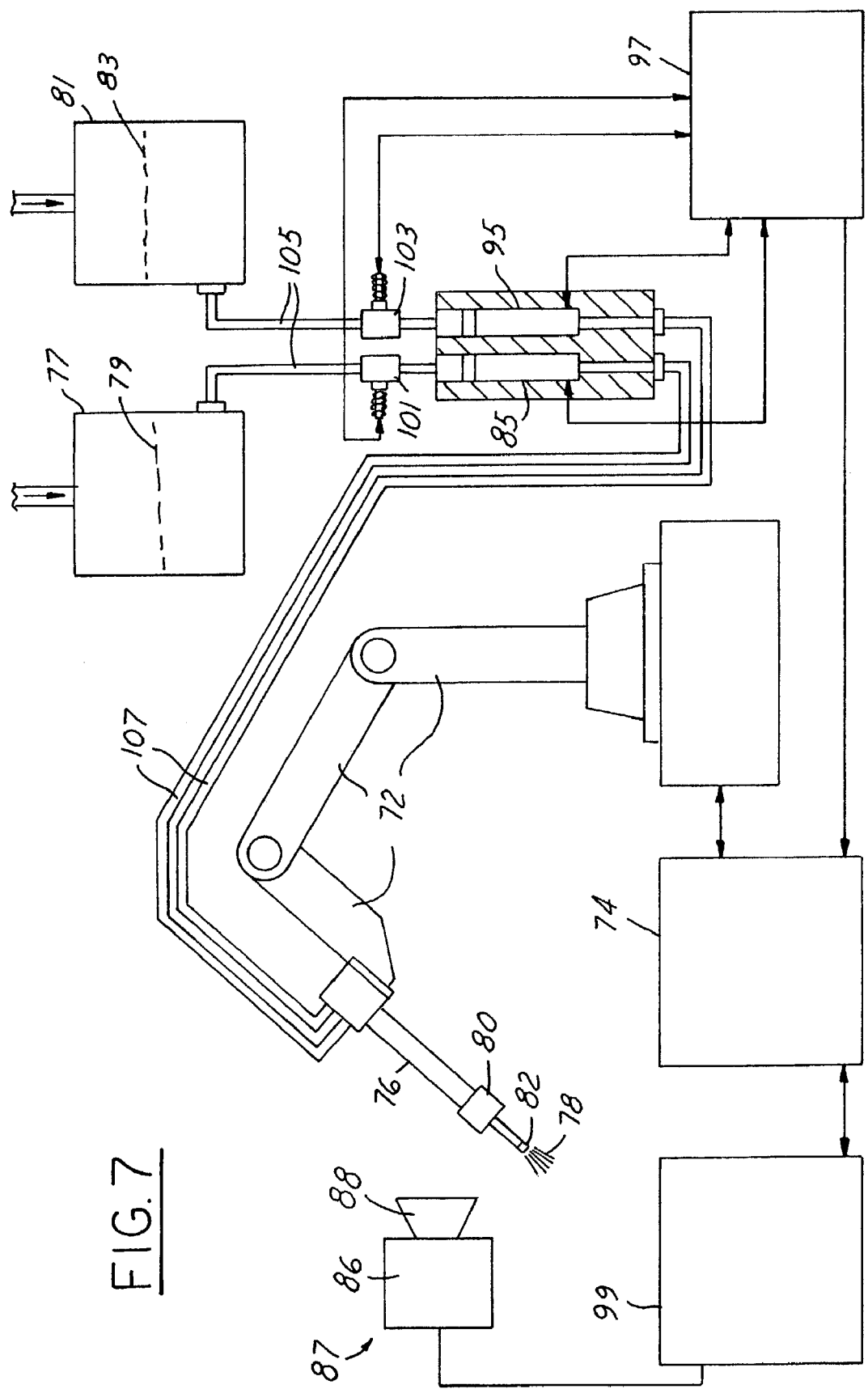
FIG. 7 is a perspective view of a robotic high volume foam application device injecting a foam within a portion of FIG. 1.

Referring now to FIG. 7, the robotic viscous fluid application device 70 comprises a robotic arm 72. The arm 72 is capable of movement in three-dimensions and is electrically controlled using a robotic controller 74. The device 70 has a high-pressure static mixer 76 that ensures proper mixing of a two-component viscous fluid composed of a precursor resin 79 and a crosslinking resin 83 that exothermically react to form a reacted viscous material. The reacted viscous material is also expanded to form the foam 78 that is dispensed from the static mixer 76 through an anti-drool nozzle 80 within the cavities 28, 30. The preferred methods for forming the reacted viscous material and foam 78 are described below.

The precursor resin 79 and crosslinking agent 83 are stored in paste form in a respective storage tank 77, 81 prior to introduction into the static mixer 76. The precursor resin 79 and crosslinking agent 83 are separately dispensed from their respective storage tanks 77, 81 via high-pressure lines 105 to a respective shot meter 85, 95. Preferably, each metering device 101 is a servo motor or hydraulic motor.

The shot meters 85, 95 are electrically coupled to a dispensing controller 97 to control the amount of precursor resin 79 and crosslinking agent 83 entering a chamber region of the respective shot meter 85, 95. The shot meters 85, 95 preferably have sensors coupled to the dispensing controller 97 indicating a filled position and unfilled position within the chamber region. The relative position of filled and unfilled positions within the chamber region are predetermined by the controller 97 based upon the desired shot volume within the static mixer 76 and are dependent upon numerous factors, including the ratio of precursor resin 79 to crosslinking agent 83, the size of the respective cavities 28, 30, and the expansion rate of the foam as determined by the composition of the respective precursor resin and crosslinking agent 83.

The dispensing controller 97 opens the respective metering device 101 to allow the flow of resin 79 or crosslinking agent 83 into the respective shot meter 85, 95 until the sensors determine a filled position (i.e. the shot meter 85, 95 contains the proper predetermined volume of resin 79 and crosslinking agent 83). The dispensing controller 97 then sends an electrical signal to the robotic controller 74 indicating that the respective shot meters 85, 95 are in the filled position and ready for dispensing. The robotic controller 74 sends a signal back to the dispensing controller that the robotic arm 72 is in position within the respective cavity 28, 30. The dispensing controller 97 directs the shot meters 85, 95 to completely evacuate the resin 79 and crosslinking agent 83 from the respective shot meters 85, 95 to the static mixer 76 through a pair of hoses 107. The static mixer 76 as described above mixes the resin 79 and crosslinking agent 83 to form the viscous material that is dispensed with the respective cavity 28, 30 through the coupled nozzle 80.

The static mixer 76 thoroughly mixes the precursor resin 79 and crosslinking agent 83 entering via hoses 107. During this mixing process, the precursor resin 79 and crosslinking agent 83 begin to cure via an exothermic reaction to form a reacted viscous material. The reacted viscous material may also be expanded within the static mixer 76 or within the cavities 28, 30 to form a foam 78. The preferred methods for forming the foam 78 are described below.

The mixer 76 is coupled to an "anti-drool" nozzle 80 that prevents the foam 78 from dripping from the nozzle tip 82 during dispensing. The device 70 also has a three-dimensional vision system 84 electrically coupled to a line controller 99 that is capable of locating each fill hole 32, 34 (in FIG. 7 fill hole 32 is shown). Thus, the vision system 84 determines the location of the fill hole 32, 34 and sends a signal to the controller 99. The controller 99 then sends an electrical signal to the robotic controller 74 to move the robotic arm 72 to the location of the respective fill hole 32, 34. As described above, the robotic controller 74 then sends a signal to the dispensing controller 97 to direct the release of the precursor resin 79 and crosslinking agent from the respective shot meters 85, 95 in a controlled volume and ratio.

The controllers 74 parameter programming is open architecture, allowing robot controls to access the controller 74 database via device-net communications to reduce processing time. Of course, while three controllers 74, 99, 97 may control all of the functions described above, it is specifically contemplated that one or two integrated controllers may be utilized in a method well known to those of ordinary skill in the art.

The three-dimensional vision system 84 preferably comprises a camera 86 and lens 88 located remotely within the foam injection cell 60 and electrically coupled to a line controller 99. Of course, in alternative embodiments, the vision system 84 preferably including the camera 86 and lens 88 could be coupled to virtually any portion of the robotic device 70.

The device 70 is capable of introducing the foam 78 in the respective cavities 28, 30 at 3000 cubic centimeters (cc) shot volume and a rate of 150 ccs per second, and more preferably at a rate exceeding 100 ccs per second. This ensures that the cavity 28, 30 is filled within enough foam 78 prior to expansion to substantially fill the cavity 28, 30 after foam expansion. Further, because the shot volume is limited, overfilling of the respective cavity is avoided.

The structural foam 78 used is preferably formed from a commercially available two-component material that exothermically reacts and expands within the cavities 28, 30 to form a high strength, high modulus foamed polymer material. As one of ordinary skill appreciates, the ultimate physical properties of the foam 78 are dependent upon numerous factors, including the chemical composition of the precursor resin 79 and crosslinking agent 83, the presence or absence of catalysts and other reaction aids, and the shape of the respective cavities 28, 30. Reinforcing materials such as glass fibers or beads may be added as well to enhance strength characteristics of the foam 78.

The expansion of the foam 78 can be accomplished in many different ways. For example, the foam 78 could be produced due to the creation of gas produced from the reaction between the precursor resin 79 and the crosslinking agent 83. Alternatively, a foaming agent could be introduced to the reacting mixture as a gas (blowing agent) within the static mixer 76 or within the nozzle portion 80 as the viscous fluid exits into the respective cavity 28, 30.

Another foaming alternative is to utilize expand cell technology to foam the viscous materials. Expand cells are small gas-filled balloon materials that expand when heated. The heat generated during this exothermic reaction of the viscous components within the static mixer 76 and cavity 28, 30 causes the expansion of gas within the expand cells, therein creating pockets within the reacted viscous components. These pockets create a foamed structure. The introduction of the expand cells to the viscous mixture may be controlled in a wide variety of methods. For example, the expand cells may be introduced to either the precursor resin 79 or crosslinking agent 83 within respective tanks 77, 81. Alternatively, the expand cells could be separately introduced to the static mixer 76 or nozzle 80 region.

One preferred foam 78 is formed from the reaction of epoxy-based precursor resin 79 with an amine-based crosslinking agents 83 foamed using expand cell technology. The epoxy groups of the epoxy-based precursor resin 79 react with the amine groups of the amine-based crosslinking agent 83 to form a reacted epoxy-amine adduct. The heat generated during this exothermic reaction causes the expansion of gas within the expand cells, therein creating pockets within the reacted epoxy-amine adduct (i.e. foam 78). One preferred type of expand cell utilized in the foaming process is Terecore, available from Henkel.

In another preferred embodiment, an epoxy amine adduct is formed as above and subsequently expanded using gas evolution technology. In gas evolution technology, a secondary reaction product formed in addition to the epoxy-amine adduct is used to expand the epoxy-amine adduct expands to forms the foamed structure 78.

In yet another preferred embodiment, polyurethane polymers are formed by the reaction of polyol resins (the precursor resin 79) and blocked or unblocked isocyanate-based polymers (the crosslinking agent 83). This polyurethane polymer is foamed by introducing nitrogen during the reaction process as a blowing agent.

Figure 8:
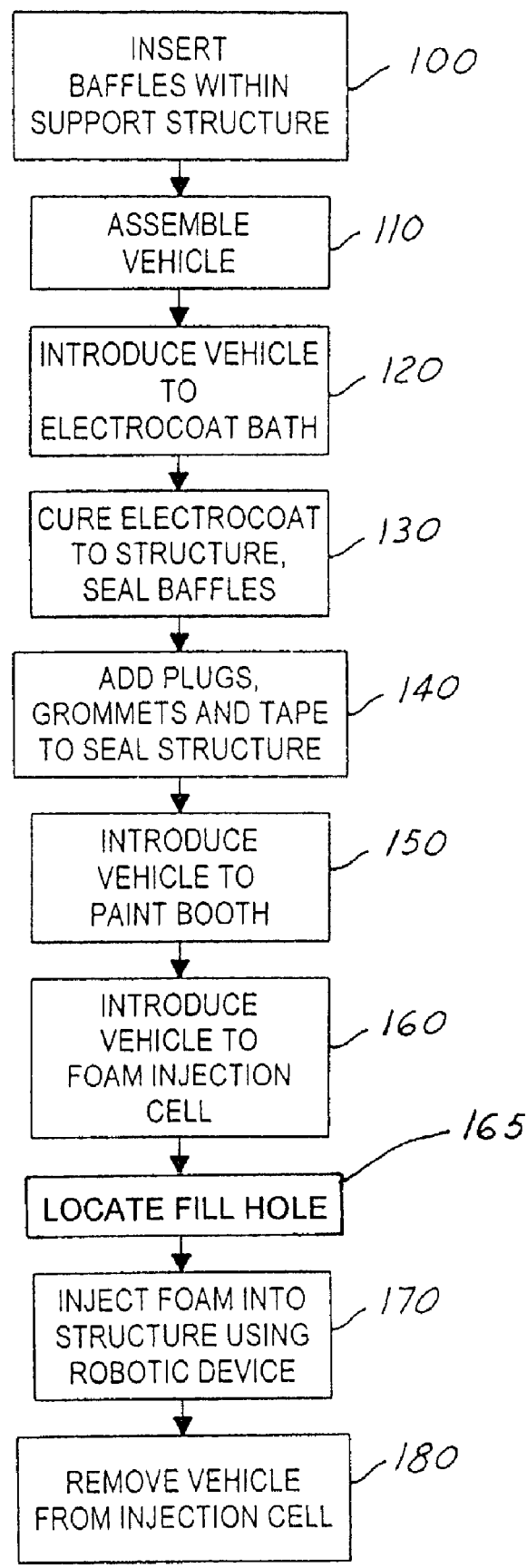
FIG. 8 is a logic flow diagram of the process for injecting foam into a portion of the support structure as shown in FIG. 7.

FIG. 8 illustrates a process flow chart for forming the foam reinforced D-pillars 18 as shown above in FIGS. 2–5 according to a present invention.

In Step 100, a pair of baffles 40 is inserted within outer and inner portions 25, 27 each of the pairs of D-pillars 18. Each baffle 40 is error proofed to assure presence and proper location within its respective portion 25,27. The outer portion 25 is then coupled to the inner portion 27 to form the D-pillar 18 containing the baffle 40.

Next, in step 110, the vehicle body, including the various pillars 12, 14, 16, 18 and rails 20, 22, 24, 26 described above, are assembled to form the support structure 10.

In step 120, the support structure 10 is then introduced through an electrocoat bath. The electrocoat bath introduces a layer of electrocoat 43 to all exposed surfaces of the structure 10 at a thickness that is dependent upon the electrical charge applied to the assembly in a method well known in the art. The composition of the electrocoat 43 is preferably an amine-capped epoxy that is reacted with a blocked isocyanate material well known to those of skill in the art.

In step 130, the coated structure 10 is introduced to a baking oven, wherein the electrocoat 43 is cured to the metal parts comprising the structure 10. At the same time, the baffles 40 expand to seal to the inner walls 41 between the outer portion 25 and inner portion 27, therein forming the upper and lower cavities 28, 30.

Next, in step 140, a series of plugs, grommets and tape are installed into or over the remaining cavity holes 50 on the sealer deck 52. In addition, the septums 32A, 34A covering the fill holes 32, 34 are introduced.

The entire structure 10 is then introduced to a paint booth in step 150, wherein the various body panels are painted and otherwise processed in a method well known in the art.

After paint processing, in Step 160, the structure 10 is introduced to a structural foam injection cell or area that contains the robotic viscous fluid application device 70. Next, in Step 165, the vision system 84 locates the respective fill holes 32, 34 and sends a signal to the line controller 99. The line controller 99 then interprets the electrical signal and sends a second electrical signal to the controller 74 of the robotic viscous fluid application device 70 as a function of the fill hole locations 32, 34.

In Step 170, the robotic viscous fluid application device 70 interprets the processed signal sent from the controller 74, moves the robotic arm 72 to the location of the respective fill hole 32, 34, and inserts the nozzle portion 80 within the respective fill hole 32, 34 such that the septum 32A, 34A is sealingly engaged to the nozzle portion 80 and such that the tip 82 is contained within the respective cavity 28, 30. The robotic controller 74 then sends a signal to the dispensing controller 97 that the robotic arm 72 is properly positioned. The dispensing controller 97 sends a signal to the shot meters 85, 95 to release the precursor resin 79 and crosslinking agent 83 to the static mixer 76. The static mixer 76 thoroughly mixes the resin 79 and crosslinking agent 83 to form a reacted viscous material that begins to foam. The foam 78 is subsequently injected through the tip portion 82 of the nozzle 80 and into the respective fill hole 32, 34. The foam 78 is allowed to further expand to within the respective cavity 28, 30. The expansion rate and flow rate of the foam 78 is predetermined to ensure complete filling of the respective cavity 28,30 at a desired density.

Finally, in Step 180, the structure 10 is removed from the foam injection cell 60. The structure 10 may then be further processed to introduce various components and features to the respective pillars 12,14, 16,18 and rails 20, 22, 24, 26 to form the vehicle 9 in a method well known in the art and not a subject of the present invention.

The present invention thus provides a new process for robotically applying high volumes of structural foam for construction of support structures. The process uniquely integrates systems communications, non-contact vehicle insertion point locating, and applications controls that accurately dispenses a two-component viscous material at a high volume and high flow rate. The dispensing control system parameter programming is open architecture allowing robot controls to access a database via device-net communications to reduce processing time.

While the invention has been described in terms of preferred embodiments, it will be understood, of course, that the invention is not limited thereto since modifications may be made by those skilled in the art, particularly in light of the foregoing teachings. For example, while the support structure 10 above contemplated the use of the robotic viscous fluid application device 70 on a D-pillar 18, it is specifically contemplated that any hollow support structure other than a D-pillar 18 may be injected with a support foam using the same process. Further, while the use of a two-component epoxy foam 78 is preferred, other foaming chemistries or viscous fluids may be introduced to a cavity using the device 70.

What is claimed is:

1. A method for reinforcing hollow support structures comprising:
   providing the hollow support structure having an inner wall and a fill hole;
   introducing a pair of baffles within the hollow support structure;
   applying an electrocoat coating to said hollow support structure and said pair of baffles;
   heating said hollow support structure within an oven to expand said pair of baffles to seal to said inner wall of said hollow support structure, therein forming a cavity defined between each of said pair of baffles and within said inner wall;
   forming a two-component viscous fluid within a robotic viscous fluid application device;
   injecting a high volume of said two-component viscous fluid from said robotic viscous fluid application device through said fill hole at a high fill rate, wherein said two-component viscous fluid reacts to form a reacted viscous fluid and wherein said reacted viscous fluid expands to form a foam that substantially fills said cavity.

2. The method of claim 1, wherein said high fill rate comprises a fill rate of at least 100 cubic centimeters per second and said high volume comprises of volume of at most 3000 cubic centimeters.

3. The method of claim 1, wherein forming a two-component viscous fluid comprises:
   introducing a first amount of a precursor resin to a static mixer;
   introducing a second amount of a crosslinking agent to said static mixer; and
   mixing said first amount and said second amount within said static mixer to form a two-component viscous fluid.

4. The method of claim 3, wherein forming a two-component viscous material comprises:
   providing a first storage tank having a quantity of a precursor resin and a second storage tanking having a second quantity of a crosslinking agent;
   coupling said first storage tank to a first shot meter and said second storage tank to a second shot meter;
   coupling said first shot meter and said second shot meter to a dispensing controller;
   introducing a first amount of said precursor resin within said first shot meter using said dispensing controller;
   introducing a second amount of said precursor resin within said second shot meter using said dispensing controller;
   evacuating said first amount of said precursor resin from said first shot meter to a static mixer;
   evacuating said second amount of said crosslinking agent to said static mixer; and
   thoroughly mixing said first amount of said precursor resin with said second amount of crosslinking agent within said static mixer.

5. The method of claim 1, wherein injecting a high volume of said two-component viscous fluid comprises:
   introducing said hollow support structure within a structural foam injection cell having a robotic viscous fluid application device;
   moving a robotic arm of said robotic viscous fluid application device such that a tip portion of an anti-drool nozzle of said robotic arm is sealed within said fill hole; and
   injecting a high volume of said two-component viscous fluid from said robotic viscous fluid application device through said fill hole at a high fill rate, wherein said two-component viscous fluid reacts to form a reacted viscous fluid and wherein said reacted viscous fluid expands to form a foam that substantially fills said cavity.

6. The method of claim 5, moving a robotic arm of said robotic viscous fluid application device such that an anti-drool nozzle of said robotic arm is sealed within said fill hole comprises:
   sensing said fill hole using a three-dimensional vision system;
   sending an electrical signal from said three-dimensional vision system to a line controller as a function of said sensed fill hole location;
   processing said electrical signal within said line controller;
   sending said processed signal to a robotic controller on said robotic high volume application device;
   interpreting said processed signal within said robotic controller; and
   moving said robotic high volume application device as a function of said interpreted processed signal such that a tip portion of an anti-drool nozzle of said robotic arm is sealed within said fill hole.

7. The method of claim 6, wherein injecting a high volume of said two-component viscous fluid from said robotic viscous fluid application device through said fill hole comprises:
   sending a second electrical signal from said robotic controller to a dispensing controller after said robotic high volume application device is located within said fill hole;
   sending a third electrical signal from said dispensing controller to a first shot meter and a second shot meter to evacuate a first amount of a precursor resin and said second amount of a crosslinking agent to a static mixer contained on said robotic arm;
   thoroughly mixing said first amount of said precursor resin and said second amount of said crosslinking agent to form a high volume of a two-component viscous material; and
   injecting said two-component viscous fluid from said static mixer through an anti-drool nozzle and within said cavity.

* * * * *